(12) United States Patent
Labarge et al.

(10) Patent No.: US 7,562,113 B2
(45) Date of Patent: Jul. 14, 2009

(54) METHOD AND SYSTEM FOR AUTOMATICALLY CREATING AND STORING SHORTCUTS TO WEB SITES/PAGES

(75) Inventors: Matthew Labarge, Seattle, WA (US); Gregory A. Lewis, Woodinville, WA (US); Christian H. Kulas, Munich (DE)

(73) Assignee: Microsoft Corporation, Redmond, WA (US)

( * ) Notice: Subject to any disclaimer, the term of this patent is extended or adjusted under 35 U.S.C. 154(b) by 908 days.

(21) Appl. No.: 10/819,800

(22) Filed: Apr. 7, 2004

(65) Prior Publication Data

US 2005/0229106 A1 Oct. 13, 2005

(51) Int. Cl.
G06F 15/16 (2006.01)
G06F 12/00 (2006.01)
(52) U.S. Cl. .................................... 709/203; 709/217
(58) Field of Classification Search ................. 709/203, 709/217, 218, 225–229, 250
See application file for complete search history.

(56) References Cited

U.S. PATENT DOCUMENTS

| | | | | |
|---|---|---|---|---|
| 5,895,471 A | * | 4/1999 | King et al. ............... | 707/104.1 |
| 6,100,890 A | * | 8/2000 | Bates et al. ............... | 715/826 |
| 6,859,833 B2 | * | 2/2005 | Kirsch et al. ............. | 709/224 |
| 7,191,187 B2 | * | 3/2007 | Takeshita et al. ......... | 707/102 |
| 7,343,486 B1 | * | 3/2008 | McCarty et al. .......... | 713/155 |
| 2002/0029269 A1 | * | 3/2002 | McCarty et al. .......... | 709/225 |
| 2002/0186239 A1 | * | 12/2002 | Komuro .................... | 345/738 |
| 2003/0191988 A1 | * | 10/2003 | Dalal et al. ............... | 714/39 |
| 2004/0201613 A1 | * | 10/2004 | Simpson et al. .......... | 345/738 |
| 2005/0204041 A1 | * | 9/2005 | Blinn et al. ............... | 709/225 |

* cited by examiner

*Primary Examiner*—Zarni Maung
(74) *Attorney, Agent, or Firm*—Merchant & Gould P.C.; Alton Hornsby, III

(57) ABSTRACT

Methods and systems are provided for automatically creating and storing shortcuts to desired web sites/pages to a user identity-based shortcuts list that are accessible by the user from a variety of remote computing devices and locations. The shortcuts are automatically created and are added to the user's shortcuts list for visited web sites/pages when the properly authenticated user visits the web sites/pages. If the user is not properly authenticated, the user may be allowed to visit selected sites/pages, but shortcuts to those sites/pages are not added to the visiting user's shortcuts list.

20 Claims, 3 Drawing Sheets

METHOD AND SYSTEM FOR AUTOMATICALLY CREATING AND STORING SHORTCUTS TO WEB SITES/PAGES

FIELD OF THE INVENTION

The present invention generally relates to using and saving addresses to sites in a distributed computing system. More particularly, the present invention relates to methods and systems for automatically recording shortcuts to Internet-based web pages.

BACKGROUND OF THE INVENTION

With the advent of distributed computing networks such as the Internet, computer users have become accustomed to visiting and utilizing a wide variety of information sites. Some systems allow one user to invite another user to visit one or more web sites/pages via an electronic mail invitation containing an embedded web site/page link that the second user may select for browsing to the associated web site/page. If the user selects one or more embedded web site links, the user's web browsing application is directed to a web page associated with the selected link.

Hyperlinks to various Internet-based sites can be difficult to remember, particularly when a user deals with many different sites at one time or many web pages within one site. Many users maintain a list of web site/page address shortcuts, but maintaining such a list is time consuming and requires the user to manually add a site/page address to the user's shortcuts list when a new site/page is visited by the user. Moreover, such lists of shortcuts are typically machine-based, so the user does not have access to the list if the user operates from a different computer from which the list was created. Some web browsing applications maintain a history (list) of all sites visited by a user, but such history lists are also machine-based and are not readily accessible by a user operating from a different computer from which the sites were visited.

There is a need for methods and systems for automatically recording shortcuts to desired Internet-based web sites and/or pages where a list of recorded shortcuts is tied to a user's identity so that the list may be accessed from a variety of computers and from a variety of computing locations.

It is with respect to these and other considerations that the present invention has been made.

SUMMARY OF THE INVENTION

Embodiments of the present invention solve the above and other problems by providing methods and systems for automatically recording shortcuts to desired web sites or web pages visited by a user that is identity-based and that may be accessed by the user from a variety of computers and from a variety of computing locations. Generally described, by selecting a web site/page link, a user's own list of web site/page shortcuts is updated to include the selected link. To prevent unauthorized users from causing updates to an authorized user's shortcuts list, only an authenticated user may visit a selected site/page in a manner that causes a shortcut to the selected site/page to be added to the user's shortcuts list.

More particularly, according to aspects of the present invention, when a sending party sends a web site/page link (site/page address) to a user to invite the user to visit the site/page, the web site link is modified to redirect the visiting user's web browsing application to a first redirection page associated with the site/page. The first redirection page requires the visiting user to be authenticated for saving or otherwise updating shortcuts in the shortcuts list. According to aspects of the invention, user authentication may take a variety of forms, such as logging in using authentication credentials such as user name and password, or automatically logging in where authentication credentials have been saved to the user's computer, or gaining access to the shortcuts list via another application the user is authorized to use, and the like. If the user is not authenticated, the user's browsing application is redirected to the selected web site/page, but no updates are made to the user's shortcuts list.

If the user is authenticated, the first redirection page obtains identification and address information for the selected web site/page. The first redirection page also queries a web page database for identification and address information on the visiting user's own web site/page. The first redirection page then redirects the visiting user's browsing application to a second redirection page associated with the visiting user's own web site/page. If desired, a second authentication of the visiting user may be performed by the second redirection page.

The second redirection page saves identification and address information for the selected web site/page to a visiting user's shortcuts list. That is, a shortcut for the selected web site/page is added to the user's shortcuts list. According to one aspect of the invention, the visiting user's shortcuts list is maintained and updated at a remote storage location that may be accessed by the user from a variety of computing systems and computing locations. After the visiting user's shortcuts list is updated, as described, the visiting user's browsing application is redirected to the selected web site/page (link). That is, the visiting user's browsing application is automatically redirected to the original web site/page to which the user was invited before the site link (address) was modified to redirect the user's browsing application for updating the shortcuts list.

These and other features and advantages, which characterize the present invention, will be apparent from a reading of the following detailed description and a review of the associated drawings. It is to be understood that the foregoing general description and the following detailed description are exemplary and explanatory only and are not restrictive of the invention as claimed.

DETAILED DESCRIPTION

As briefly described above, embodiments of the present invention are directed to methods and systems for automatically creating and storing shortcuts to desired web sites/pages to a user identity-based shortcuts list that is accessible by a user from a variety of remote computing devices and locations. The shortcuts are automatically created and are added to the user's shortcuts list for visited web sites/pages when the properly authenticated user visits the web sites/pages. If the user is not properly authenticated, the user may be allowed to visit selected sites/pages, but shortcuts to those sites/pages are not added to the visiting user's shortcuts list. The terms site and page will be used interchangeably hereafter. As is well known to those skilled in the art, a web site may consist of a single web page, or a web site may comprise a number of web pages.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
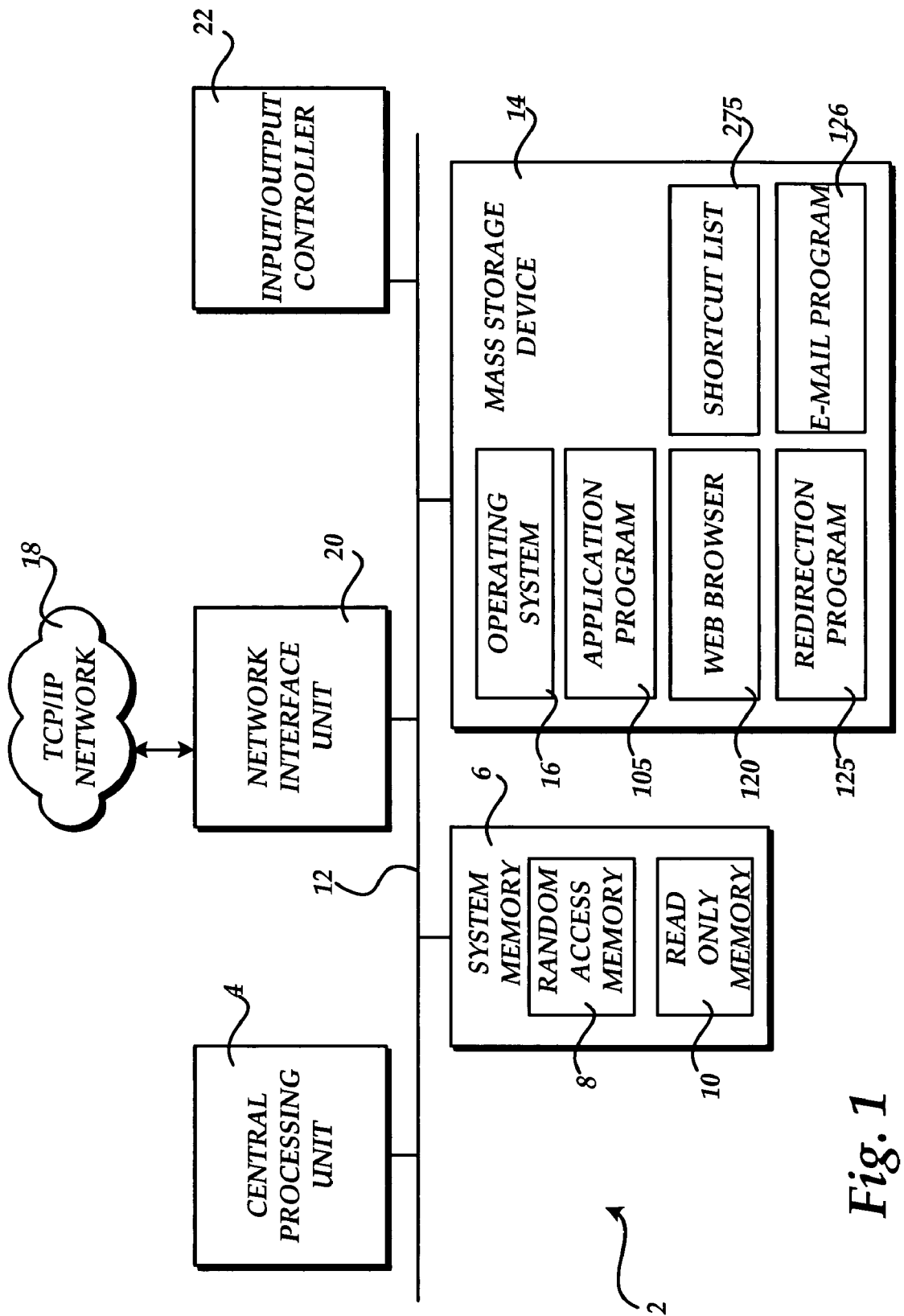
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 105, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for creating and editing a variety of documents. For instance, the application program 105 may comprise a word processing application program, a spreadsheet application, a contact application, and the like. Other applications illustrated in FIG. 1 and applicable to embodiments of the present invention include the web browsing application 120, a redirection program 125 and the electronic mail application 126. A shortcuts list 275 is illustrated that will be discussed below with respect to FIGS. 2 and 3.

Figure 2:
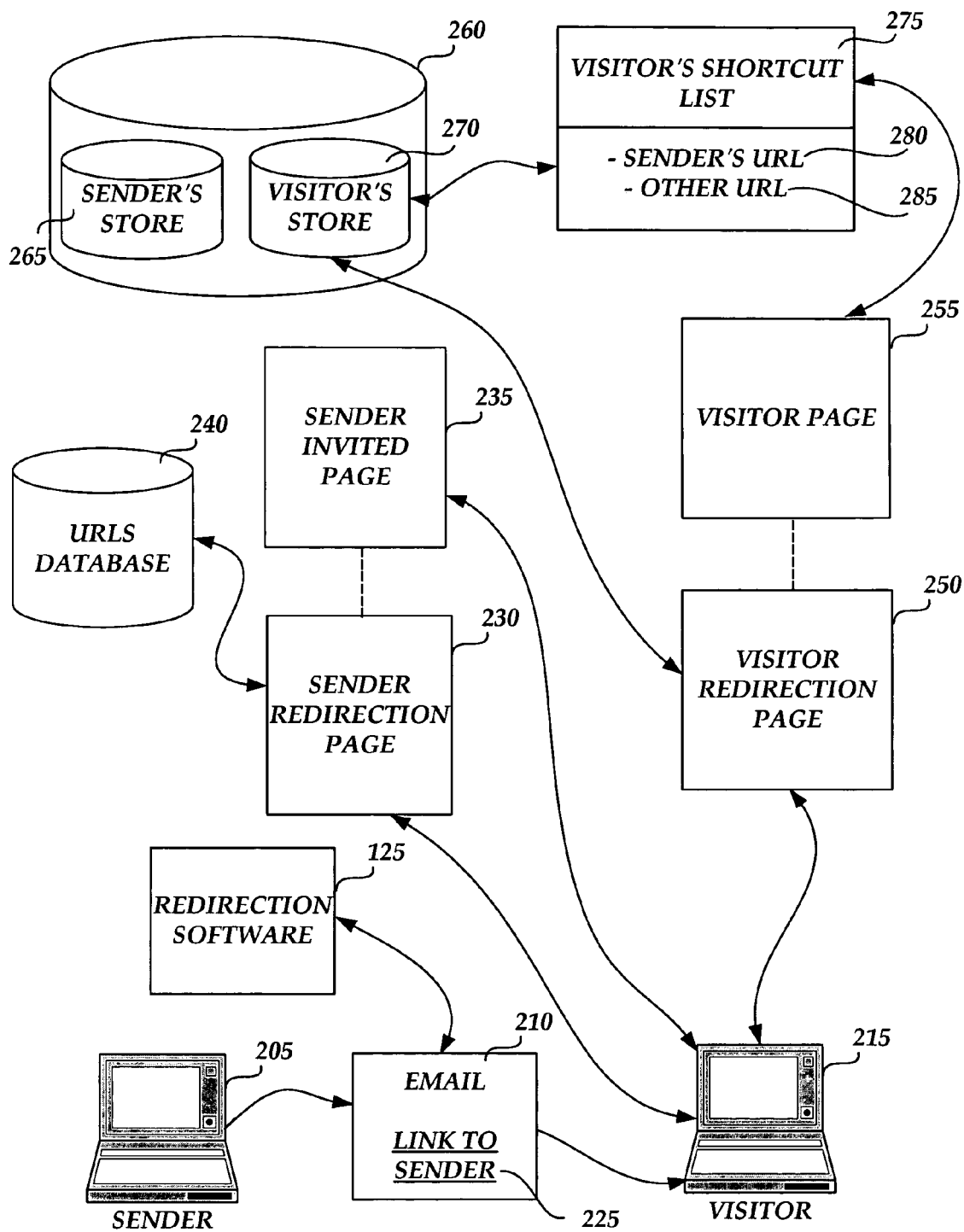
FIG. 2 is a simplified block diagram illustrating a distributed computing architecture that provides an exemplary operating environment for embodiments of the present invention.

FIG. 2 is a simplified block diagram illustrating a distributed computing architecture that provides an exemplary operating environment for embodiments of the present invention. According to embodiments of the present invention, an electronic mail sender 205 may send an electronic mail message 210 to a visiting user 215 to invite the visiting user 215 to visit a web page of the sender 205 by selecting a link 225 to the web page embedded in the electronic mail message. The sender may desire that the visiting user visit the particular link for a variety of reasons. For example, the sender 205 and the visiting user 215 may be members of two work teams in a company where each team maintains its own Internet-based web site or page through which it receives, sends and disseminates information to other members of its team and to other parties outside the team.

Systems have been developed for allowing a multitude of collaborative services that allow teams or individuals to create web sites/pages for information sharing and document collaboration. For example, a company may maintain a server on which various employees of the company or teams of employees of the company maintain individual web sites/ pages to which other employees or teams and to which individuals outside the company may visit for information and work collaboration. An example of such a collaborative services system includes SharePoint™ manufactured by Microsoft Corporation of Redmond, Wash. The operating environment illustrated in FIG. 2 may readily operate according to such a system, but it should be understood that operation of the present invention is not limited to such systems, and the present invention may be utilized for automatically saving a web site/page shortcut to a visiting user's shortcuts list according to many integrated and distributed computing systems, as described herein.

Referring still to FIG. 2, a redirection software module 125 is illustrated. According to embodiments of the present invention, the redirection software module includes sufficient computer executable instructions which, when executed by a computer, may modify a web site link 225 so that selection of the modified link 225 redirects a user's web browsing application 120 to a redirection page for processing according to embodiments of the present invention described below. A sender web page 235 and an associated sender redirection page 230 are illustrated for visitation by a visiting user 215 via the visiting user's web browsing application. As should be appreciated, the sender web page 235 may be a non-public home page to which the visiting user is invited, or the sender web page may be any number of public web pages of interest to the email sender to which the sender desires to invite the visiting user. A visiting user web page 255 and an associated visiting user redirection page 250 are illustrated for providing information about a visiting user's web page and for saving identification and address information (shortcut) associated with a sender web page 235 to a visiting user's shortcuts list 275 described below. As should be appreciated, the sender redirection page 230 and the visiting user redirection page 250 may operate as a single redirection page for performing the functionality described herein for each of the sender redirection page and the visiting user redirection page.

A database 240 is illustrated associated with the sender redirection page 230 from which the sender redirection page 230 may obtain web page addresses such as a web page address (uniform resource locator (URL)) for the visiting user web page 255. A database 260 is illustrated for maintaining a sender's store 265 and a visiting user's store 270. The sender's store 265 and the visiting user's store 270 may include data accessible by the sender's web page 235 and the visiting user's web page 255, respectively. For example, the visiting user's store 270 may include stored links (shortcuts) created and stored as described herein, and the visiting user's shortcuts list 275 may include a view to the shortcut information stored in the visiting user's store 270.

According to an embodiment of the present invention, all of the components of the present invention described with reference to FIG. 2 may be included in a collaborative services system such as the Microsoft SharePoint™ system described above. Alternatively, the components of the present invention described with reference to FIG. 2 may operate remotely from each other in a distributed computing environment. That is, the present invention may be implemented in any integrated or distributed computing system, which allows for per-user storage such as the sender's store 265 and the visiting user's store 270 for storing shortcuts for the respective users and which uses links (for example, hyperlinks) to access content of one or more web sites/pages such as the sender's page 235 and the visiting user's page 255. Operation of the components of the present invention described with reference to FIG. 2 is described in further detail below with reference to FIG. 3.

Figure 3:
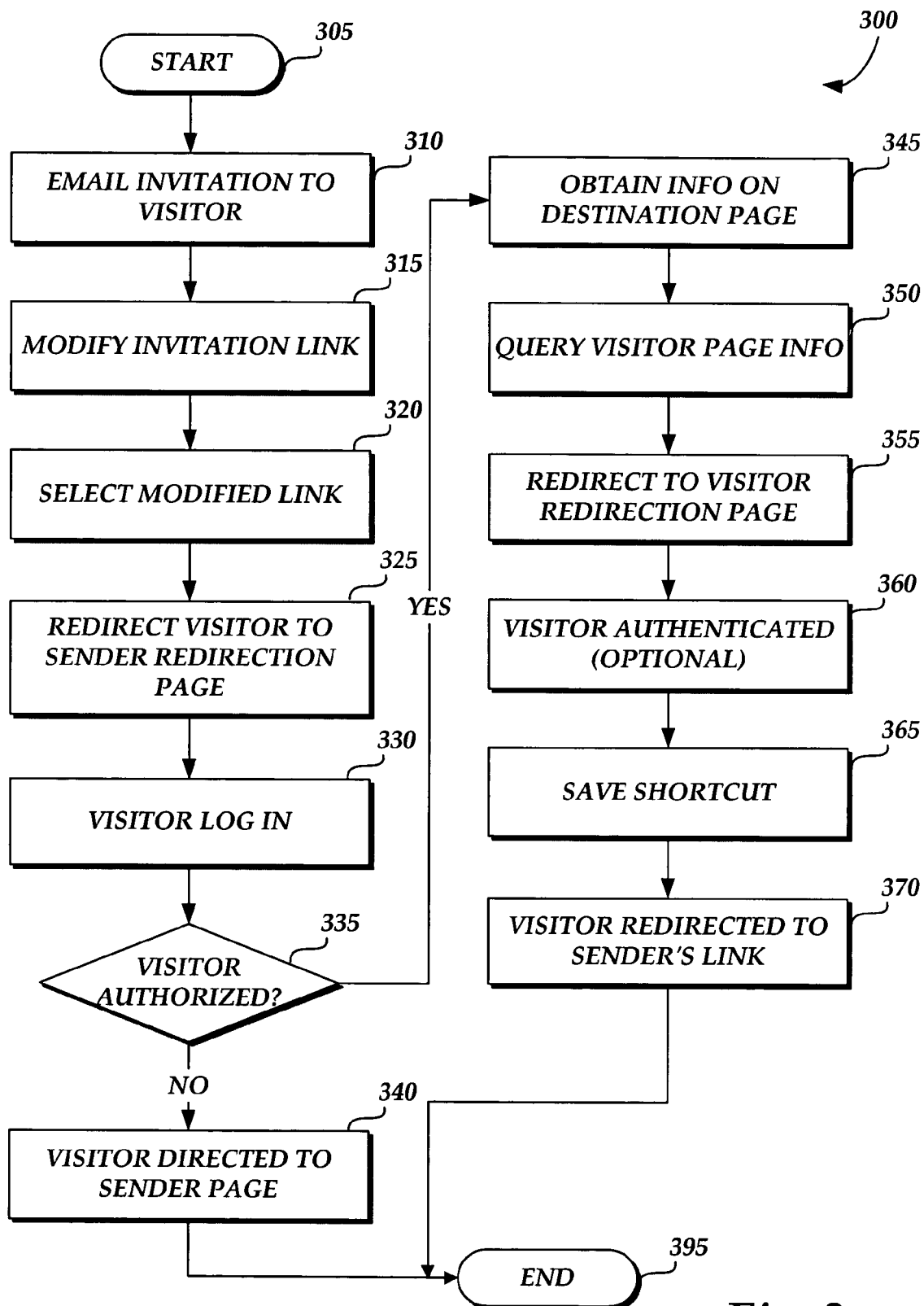
FIG. 3 is a flow diagram showing an illustrative routine for automatically recording shortcuts to desired web sites/pages according to embodiments of the present invention.

FIG. 3 is a flow diagram showing an illustrative routine for automatically recording shortcuts to desired web sites/pages according to embodiments of the present invention. For purposes of description, the components of the present invention described with reference to FIG. 2 will be described in terms of the flow diagram illustrated in FIG. 3 and in terms of an example sender web site/page to which a visiting user 215 is invited to browse.

The routine 300 begins at start block 305 and proceeds to block 310 where an electronic mail message 210 is sent from a sender 205 to a visiting user 215 inviting the visiting user 215 to browse to the sender's web page 235 as identified by a link 225 to the sender's web page embedded in the email message 210. For purposes of example, assume that the sender web page is located at a web site address URL such as http://www.portal.com/sender. Accordingly, the link 225 contained in the email 210 includes the web page address of http://www.portal.com/sender.

Before the email message is sent to the visiting user 215, the routine proceeds to block 315, and the redirection software module 125 intercepts and modifies the link 225 so that selection of the modified link will redirect the visiting user's web browsing application to the sender redirection page 230. For example, the modified link 225 may be modified from the example web address of http://www.portal.com/sender to a modified web address of http://www.portal.com/sender/system/redirect.aspx. Accordingly, when the visiting user 215 receives the electronic mail message 210, the link 225 embedded in the email message 210 is the modified link http://www.portal.com/sender/system/redirect.aspx.

At block 320, the visiting user 215 selects the modified link to cause the user's web browsing application to open a web page associated with the link 225 to which the visiting user has been invited to browse. At block 325, because the link selected by the visiting user 225 is the modified link, for example http://www.portal.com/sender/system/redirect.aspx, the visiting user's Internet browser is redirected to the sender redirection page 230 as opposed to the sender web page 235.

At block 330, the sender redirection page 230 may launch an authentication dialog for authenticating the visiting user as having permission to automatically create a shortcut to the sender's web page 235 and to store the automatically created shortcut in the visiting user's shortcuts list 275. As should be appreciated, an authentication requirement may be necessary to prevent unauthorized parties from saving unwanted or otherwise undesirable web page shortcuts to the visiting user's shortcuts list 275. In response to the authentication dialog presented to the visiting user by the sender redirection page 230, the visiting user may provide proper authentication credentials (e.g., username and password), the visiting user may refuse to authenticate as requested, or the visiting user may have valid credentials, but is otherwise unauthorized to access the sender redirection page. Other forms of authentication may be utilized. For example, the visiting user may be allowed to "automatically" log in from the user's own computer where the user has previously stored authentication credentials via the user's computer. Or, the user may be authenticated via another software application that may be used to access the functionality of the present invention through which the user has been properly authenticated. Alternatively, no authentication may be required in circumstances where it is considered appropriate to allow anyone to update the shortcuts list from the computer accessing the sender redirection page.

According to one embodiment, where the visiting user refuses to authenticate as requested, or where the visiting user has valid credentials, but is otherwise unauthorized to access the sender redirection page, the routine proceeds to block 340, and the visiting user is automatically redirected to the original (pre-modified) link for the sender web page 235 without creating a shortcut to the sender web page 235, as described herein. That is, because the user does not authenticate as having permission to create a shortcut for the selected link, the visiting user 215 is nonetheless allowed to browse to the sender's web page 235 because the sender 205 invited the visiting user to browse to the sender's web page 235. As should be appreciated, a visiting user may have valid authentication credentials, but some other condition may prevent the creation and saving of a shortcut. For example, the memory capacity for storing new shortcuts may be exceeded or some type of hardware or software problem may prevent creating and saving a shortcut to the store 270. According to an embodiment of the present invention, in order to direct the visiting user 215 to the sender web page 235 at block 340, the sender redirection page 230 returns to the browsing application 120 of the visiting user 215 the original web page address, for example http://www.portal.com/sender, provided to the visiting user 215 by the sender 205. If the visiting user is directed to the sender web page at block 340, the method ends at block 395.

Alternatively, under some circumstances, it may be desirable that only authorized visiting users be allowed to access the sender's web page 235. Accordingly, where the visiting user refuses to authenticate as requested, or where the visiting user lacks valid credentials, a second authentication process may be required before the visiting user is redirected to the sender's web page 235 to which the user has been invited. As should be appreciated, a different set of authentication credentials may be utilized for the second authentication process as compared to the first authentication process (authentication to the sender's web page 235) to allow such access to the sender's web page 235 where authorization to save a shortcut was not allowed.

According to embodiments of the invention, at any stage in the described process, the redirection pages (sender redirection page 230, visiting user redirection page 250) have enough information to redirect the browsing application of the visiting user 215 to the intended destination page in the event errors occur in the process of creating and storing a shortcut to the destination page. That is, if any error occurs, such as an authentication error, storage space error, and the like that prevents the creation and storage of a given shortcut, the browsing application 120 of the visiting user 215 may be automatically redirected to the destination page so that the user may browse to the destination web site/page even though a shortcut to the destination web site/page has not been created and stored.

Referring back to block 335, if the visiting user properly authenticates as a party that is authorized to create and save shortcuts to the visiting user's shortcuts list 275 according to embodiments of the present invention, the routine proceeds to block 345. At block 345, the sender redirection page 230 obtains information about the destination web page (sender web page 235) to which the visiting user 215 is attempting to browse and for which the visiting user 215 desires to create a shortcut for storing in the visiting user's shortcuts list 275. Information gathered by the sender redirection page includes the web page address (URL) for the destination web page, a friendly name of the destination web page (for example, "sender's page"), a web page type (for example, sub web), and a description of the destination web page (for example, "sender's production management team web site").

Simultaneous with gathering the above-referenced information, at block 350, the sender redirection page 230 queries the database 240 for information about the visiting user's web space, including identification information and address information for the visiting user's web page 255 and the associated visiting user redirection web page 250. Information on the visiting user's web space is needed both for redirecting the visiting user's browsing application to the visiting user's web space and for obtaining information stored in the visiting user's web space. For example, according to one embodiment of the present invention, when the visiting user 215 receives the email message 210 from the sender 205, the original link provided by the sender and information associated with the original link are stored at the visiting user web page 255. Accordingly, at block 345, the sender redirection page 230 may obtain required information about the destination page to which the visiting user has been invited by utilizing the visiting user web page address, for example http://www.portal.com/visitinguser, for obtaining the required information from the visiting user web page 255.

Referring back to block 355, the sender redirection page 230 returns to the web browsing application of the visiting user 215 a web page address for the visiting user redirection page 250, for example http://www.portal.com/visitinguser/system/redirect.aspx. Along with the web page address for the visiting user redirection page 250, the sender redirection page 230 forwards the information gathered for the sender web page 235 for use by the visiting user redirection page 250 for creating and storing a shortcut to the sender web page 235 to the visiting user's shortcuts list 275.

At block 360, according to an embodiment of the present invention, the visiting user 215 may be authenticated for a second time to ensure that the visiting user 215 is authorized to create and save a shortcut to the visiting user's shortcuts list 275. As should be appreciated, if visiting user authentication is required at block 360, and if the visiting user does not properly authenticate, the routine proceeds to block 340, as described above. If the visiting user properly authenticates at block 360, or if visiting user authentication is not required, the routine proceeds to block 365.

At block 365, the visiting user redirection page 250 saves information gathered by the sender redirection page 230 on the sender web page 235 to the visiting user's store 270. A shortcut such as "sender's URL" 280 is created by the visiting user redirection page 250 and is saved to the visiting user's shortcuts list 275, as illustrated in FIG. 2. After the shortcut to the sender web page is created and is stored, as described, the routine proceeds to block 370. At block 370, the visiting user redirection page 250 returns the original web page address or link provided by the sender 205 to the web browsing application 120 of the visiting user 215. The browsing application then is redirected to the sender web page 235 to which the visiting user was originally invited to browse. Advantageously, as shown by the example described herein, a shortcut to a selected web page link has been automatically created and stored to the visiting user's shortcuts list in response to selection of a destination web page link by the visiting user without additional action by the visiting user except for providing authentication credentials as described above.

Once the shortcut to a given web site/page is created and stored, as described above, a user such as the visiting user 215 may access a given shortcut saved to the user's shortcuts list 275 for accessing an associated web site/page. According to the exemplary operating environment described with respect to FIG. 2, if the visiting user's shortcuts list is stored to a visitor's store 270 remote from the user's personal computer, then the shortcuts list 275 may be accessed by the user from any computer adapted for accessing data from the database 260. That is, the shortcuts list 275 is not a machine-based shortcuts list that may only be accessed from the user's computer from which user actions required for creating and storing a given shortcut were performed.

As described above, shortcuts to selected web sites/pages are only created when an authenticated visiting user 215 selects a web page link for browsing to the associated web page. Accordingly, unauthorized parties may not automatically create and add unauthorized shortcuts to the user's shortcuts list. Only parties who pass proper authentication credentials, as described above, may cause the creation and storage of a shortcut to the user's shortcuts list. For example, a first visiting user 215 may forward a web page link invitation received from the sender 205 to a different user. The different user may access the web page identified by the web page link provided by the sender, but the different user will be unable to create and store a shortcut to the web page link if the different user does not have appropriate authentication credentials as will be requested from the different user if he/she attempts to create and store a shortcut to the sender's web page link. Of course, the different user may store a shortcut to sender's web page link if he/she can provide proper authentication credentials and if the different user is associated with a "different visiting user" web page and redirection page as described above for the visiting user.

In addition to the foregoing, the redirection software module 125 in association with the redirection pages 230, 250 may be utilized to track the frequency with which a given web page link is selected. That is, the redirection pages 230, 250 may be programmed to record each selection of a given link so that usage statistics for individual web page addresses may be maintained and utilized.

As described herein, methods and systems are provided for automatically recording, creating, and storing shortcuts to desired web sites/pages visited by a user that is identity-based and that may be accessed by the user from a variety of remote computing systems and locations. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for automatically creating and storing a web page shortcut, comprising:
    creating a first web page link for redirecting a browsing application to a first redirection page;
    receiving the first web page link;
    browsing to the first redirection page;
    at the first redirection page, obtaining identification information for the first web page link, wherein obtaining identification information for the first web page link includes obtaining identification information for the first web page link only if creating a web page shortcut for the first web page link is authorized, wherein the first web page link is authorized upon receiving a first set of valid authentication credentials comprising a username and a password;
    redirecting the browsing application to a second redirection page; and
    at the second redirection page, querying a database for identification information and address information for a second web page link, wherein the identification information and address information for the second web page link is obtained simultaneously with the identification information for the first web page link; and
    at the second redirection page, creating and storing a shortcut to the first web page link using the identification information for the first web page link, wherein the shortcut to the first web page link is not created when valid authentication credentials are not received, and wherein access is granted to the first web page only upon receiving a second set of valid authentication credentials, wherein the first set of authentication credentials are different than the second set of authentication credentials.

2. The method of claim 1, wherein redirecting the browsing application to a second redirection page includes providing the second redirection page the identification information for the first web page link.

3. The method of claim 1, further comprising storing the shortcut to the first web page link to a shortcuts list.

4. The method of claim 1, further comprising after creating the shortcut to the first web page link, automatically redirecting the browsing application to the first web page via the first web page link.

5. The method of claim 1, whereby browsing to the first redirection page includes browsing to the first redirection page in response to selecting a modified web page link for browsing to the first redirection page.

6. The method of claim 1, whereby obtaining identification information for the first web page link includes obtaining a uniform resource locator (URL) address for the first web page link.

7. The method of claim 1, whereby obtaining identification information for the first web page link includes obtaining a name for the first web page link.

8. The method of claim 1, whereby obtaining identification information for the first web page link includes obtaining a description for the first web page link.

9. The method of claim 1, whereby obtaining identification information for the first web page link includes obtaining a web page type for the first web page link.

10. A method for automatically creating and storing a web page shortcut, comprising:
    creating a first web page link for redirecting a browsing application to a redirection page;
    receiving the web page link;
    at the redirection page, determining whether creating a shortcut to the web page link is authorized, wherein creating a shortcut to the web page link is authorized upon receiving a first set of valid authentication credentials comprising a username and a password;
    if the first set of valid authentication credentials is not received, then receiving a second set of valid authentication credentials, wherein access is granted to the web page link only upon receiving the second set of valid authentication credentials, wherein the first set of authentication credentials are different than the second set of authentication credentials;
    if creating a shortcut to the web page link is authorized, obtaining identification and address information for the web page link;
    automatically creating a shortcut to the web page link; and
    storing the shortcut to the web page link to a list of shortcuts.

11. The method of claim 10, after modifying the web page link for redirecting a browsing application to the redirection page, selecting the modified web page link for directing the browsing application to the web page link; and in response to selecting the modified web page link, redirecting the browsing application to the redirection page.

12. The method of claim 11, after storing the shortcut to the web page link to a list of shortcuts, redirecting the browsing application to the web page link.

13. A computer-readable storage medium on which is stored computer-executable instructions which when executed by a computer perform a method for automatically creating and storing a web page shortcut, comprising:
  creating a first web page link for redirecting a browsing application to a first redirection page;
  receiving the first web page link;
  browsing to the first redirection page;
  at the first redirection page, obtaining identification information for the first web page link, wherein obtaining identification information for the first web page link includes obtaining identification information for the first web page link only if creating a web page shortcut for the first web page link is authorized, wherein the first web page link is authorized upon receiving a first set of valid authentication credentials comprising a username and a password;
  redirecting the browsing application to a second redirection page; and
  at the second redirection page, creating and storing a shortcut to the first web page link using the identification information for the first web page link, wherein the shortcut to the first web page link is not created when valid authentication credentials are not received, and wherein access is granted to the first web page only upon receiving a second set of valid authentication credentials, wherein the first set of authentication credentials are different than the second set of authentication credentials.

14. The computer-readable storage medium of claim 13, wherein redirecting the browsing application to a second redirection page includes providing the second redirection page the identification information for the first web page link.

15. The computer-readable storage medium of claim 13, farther comprising storing the shortcut to the first web page link to a shortcuts list.

16. The computer-readable storage medium of claim 13, further comprising after creating the shortcut to the first web page link, automatically redirecting the browsing application to the first web page via the first web page link.

17. The computer-readable storage medium of claim 13, whereby browsing to the first redirection page includes browsing to the first redirection page in response to selecting a modified web page link for browsing to the first redirection page.

18. A computer-readable storage medium on which is stored computer-executable instructions which when executed by a computer perform a method for automatically creating and storing a web page shortcut, comprising:
  creating a first web page link for redirecting a browsing application to a redirection page;
  receiving the web page link;
  at the redirection page, determining whether creating a shortcut to the web page link is authorized, wherein creating a shortcut to the web page link is authorized upon receiving a first set of valid authentication credentials comprising a username and a password;
  if the first set of valid authentication credentials is not received, then receiving a second set of valid authentication credentials, wherein access is granted to the web page link only upon receiving the second set of valid authentication credentials, wherein the first set of authentication credentials are different than the second set of authentication credentials;
  if creating a shortcut to the web page link is authorized, obtaining identification and address information for the web page link;
  automatically creating a shortcut to the web page link; and
  storing the shortcut to the web page link to a list of shortcuts.

19. The computer-readable storage medium of claim 18, after modifying the web page link for redirecting a browsing application to the redirection page, selecting the modified web page link for directing the browsing application to the web page link; and
  in response to selecting the modified web page link, redirecting the browsing application to the redirection page.

20. The computer-readable storage medium of claim 19, after storing the shortcut to the web page link to a list of shortcuts, redirecting the browsing application to the web page link.

* * * * *